United States Patent
Krien (10) Patent No.: US 9,621,739 B2
(45) Date of Patent: *Apr. 11, 2017

(54) COMPUTERIZED IMAGING OF SPORTING TROPHIES AND USES OF THE COMPUTERIZED IMAGES

(71) Applicant: Krien Trust, Hays, KS (US)

(72) Inventor: David Krien, Hays, KS (US)

(73) Assignee: Krien Trust, Hays, KS (US)

( * ) Notice: Subject to any disclaimer, the term of this patent is extended or adjusted under 35 U.S.C. 154(b) by 53 days.

This patent is subject to a terminal disclaimer.

(21) Appl. No.: 14/873,038

(22) Filed: Oct. 1, 2015

(65) Prior Publication Data

US 2016/0027232 A1    Jan. 28, 2016

Related U.S. Application Data

(60) Division of application No. 13/940,592, filed on Jul. 12, 2013, now abandoned, which is a division of
(Continued)

(51) Int. Cl.

| | |
|---|---|
| *A63F 13/00* | (2014.01) |
| *H04N 1/00* | (2006.01) |
| *A63F 13/655* | (2014.01) |
| *A47G 33/00* | (2006.01) |
| *B44C 3/06* | (2006.01) |
| *G06T 15/08* | (2011.01) |

(Continued)

(52) U.S. Cl.
CPC .......... *H04N 1/001* (2013.01); *A47G 33/004* (2013.01); *A63F 13/655* (2014.09); *B44C 3/06* (2013.01); *G06T 15/08* (2013.01); *G06T 17/10* (2013.01); *G07F 17/32* (2013.01); *G06T 2200/04* (2013.01); *G06T 2215/16* (2013.01)

(58) Field of Classification Search
CPC ........ A63F 13/32; A63F 13/52; A63F 13/818; A63F 13/837
USPC .................................................. 463/2, 5, 7
See application file for complete search history.

(56) References Cited

U.S. PATENT DOCUMENTS

| | | |
|---|---|---|
| 4,744,331 A | 5/1988 | Whiffin |
| 4,753,031 A | 6/1988 | Owen |

(Continued)

OTHER PUBLICATIONS

Deer Hunter video game, published by WizardWorks Software, first released Nov. 13, 1997.*

(Continued)

*Primary Examiner* — James S McClellan
(74) *Attorney, Agent, or Firm* — Hall Estill Law Firm (57) ABSTRACT

Methods are disclosed for providing replicas of a sporting trophy and for scoring the sporting trophy. The first method includes providing a sporting trophy to be scanned, scanning the sporting trophy to provide three-dimensional image data of the sporting trophy, and providing the three-dimensional image data of the sporting trophy to a replica generating system to provide a replica of the sporting trophy. The second method includes providing three-dimensional digital data of a sporting trophy having a volume and a surface area, providing at least one sporting-relevant measurement based on the three-dimensional data of the sporting trophy, and providing a score of the sporting trophy based on the at least one sporting-relevant measurement.

6 Claims, 6 Drawing Sheets

Related U.S. Application Data application No. 12/900,971, filed on Oct. 8, 2010, now abandoned, which is a continuation-in-part of application No. 11/942,045, filed on Nov. 19, 2007, now Pat. No. 8,565,490, which is a continuation-in-part of application No. 11/700,360, filed on Jan. 31, 2007, now abandoned, which is a continuation of application No. 11/170,573, filed on Jun. 29, 2005, now Pat. No. 8,355,885.

(60) Provisional application No. 60/584,908, filed on Jul. 1, 2004.

(51) Int. Cl.
*G06T 17/10* (2006.01)
*G07F 17/32* (2006.01)

(56) References Cited

U.S. PATENT DOCUMENTS

| | | | |
|---|---|---|---|
| 4,839,675 | A | 6/1989 | Owen |
| 5,412,420 | A | 5/1995 | Ellis |
| 5,483,441 | A | 1/1996 | Scofield |
| 5,576,949 | A | 11/1996 | Scofield et al. |
| 5,594,707 | A | 1/1997 | Goto et al. |
| 5,943,388 | A | 8/1999 | Tumer |
| 5,983,552 | A | 11/1999 | Nelson |
| 6,003,228 | A | 12/1999 | Riggio |
| 6,233,049 | B1 | 5/2001 | Kondo et al. |
| 6,256,401 | B1 | 7/2001 | Whited |
| 6,286,460 | B1 | 9/2001 | Gudbjornsson |
| 6,377,353 | B1 | 4/2002 | Ellis |
| 6,476,812 | B1 | 11/2002 | Yoshigahara et al. |
| 6,542,249 | B1 | 4/2003 | Kofman et al. |
| 6,549,289 | B1 | 4/2003 | Ellis |
| 6,587,183 | B1 | 7/2003 | Uomori et al. |
| 6,763,148 | B1 | 7/2004 | Sternberg et al. |
| 6,839,453 | B1 | 1/2005 | McWilliam et al. |
| 6,877,460 | B1 | 4/2005 | Ellis |
| 6,974,373 | B2 | 12/2005 | Kriesel |
| 7,126,626 | B2 | 10/2006 | Sawahara et al. |
| 7,128,024 | B2 | 10/2006 | Doyle |
| 7,184,088 | B1 | 2/2007 | Ball |
| 7,423,658 | B1 | 9/2008 | Uomori et al. |
| 7,528,879 | B2 | 5/2009 | Kuroki |
| 7,853,046 | B2 | 12/2010 | Sharony |
| 8,036,429 | B2 | 10/2011 | Doyle |
| 8,164,983 | B2 | 4/2012 | Johnson |
| 8,355,885 | B2 | 1/2013 | Krien |
| 8,478,814 | B2 | 7/2013 | Shafter |
| 8,483,446 | B2 | 7/2013 | Demarais et al. |
| 8,712,893 | B1 | 4/2014 | Brandmaier et al. |
| 2002/0017049 | A1 | 2/2002 | Millett et al. |
| 2002/0049507 | A1 | 4/2002 | Hameen-Anttila |
| 2002/0051006 | A1 | 5/2002 | Katagiri et al. |
| 2002/0076085 | A1 | 6/2002 | Shimazu |
| 2002/0150287 | A1 | 10/2002 | Kobayashi |
| 2002/0170201 | A1 | 11/2002 | Trout et al. |
| 2003/0024481 | A1 | 2/2003 | Kalscheur et al. |
| 2003/0031360 | A1 | 2/2003 | Logan et al. |
| 2003/0115265 | A1 | 6/2003 | Kitade et al. |
| 2003/0173743 | A1* | 9/2003 | Brink ............... A63F 13/10 273/297 |
| 2004/0023612 | A1 | 2/2004 | Kriesel |
| 2004/0032974 | A1 | 2/2004 | Kriesel |
| 2004/0037450 | A1 | 2/2004 | Bradski |
| 2004/0088291 | A1 | 5/2004 | Matsuzaki et al. |
| 2004/0107147 | A1 | 6/2004 | Uemura et al. |
| 2004/0130731 | A1 | 7/2004 | Yamaguchi |
| 2004/0157527 | A1 | 8/2004 | Omar |
| 2004/0163267 | A1 | 8/2004 | Bini |
| 2005/0011466 | A1 | 1/2005 | Doyle |
| 2005/0057806 | A1 | 3/2005 | Nozawa et al. |
| 2005/0123883 | A1 | 6/2005 | Kennen et al. |
| 2005/0153359 | A1 | 7/2005 | Schaefer et al. |
| 2005/0211174 | A1 | 9/2005 | Ellis |
| 2005/0257748 | A1 | 11/2005 | Kriesel et al. |
| 2006/0005460 | A1 | 1/2006 | Bittrick |
| 2006/0126903 | A1 | 6/2006 | Sharony |
| 2007/0022967 | A1 | 2/2007 | Doyle |
| 2007/0030348 | A1 | 2/2007 | Snyder |
| 2007/0040924 | A1 | 2/2007 | Cho et al. |
| 2008/0060210 | A1 | 3/2008 | Trout et al. |
| 2008/0063885 | A1 | 3/2008 | Krien |
| 2008/0069480 | A1 | 3/2008 | Aarabi et al. |
| 2008/0080317 | A1 | 4/2008 | Inouchi et al. |
| 2008/0140234 | A1 | 6/2008 | Shafter |
| 2008/0273760 | A1 | 11/2008 | Metcalfe et al. |
| 2009/0074253 | A1 | 3/2009 | Peacock et al. |
| 2009/0135402 | A1 | 5/2009 | Krien |
| 2009/0185723 | A1 | 7/2009 | Kurtz et al. |
| 2010/0180218 | A1 | 7/2010 | Boston et al. |
| 2010/0194860 | A1 | 8/2010 | Mentz et al. |
| 2010/0226209 | A1 | 9/2010 | Johnson |
| 2010/0289879 | A1 | 11/2010 | Sinzinger et al. |
| 2010/0331086 | A1* | 12/2010 | Cuddeback ......... A01M 31/002 463/31 |
| 2011/0028212 | A1 | 2/2011 | Krien |
| 2011/0153463 | A1 | 6/2011 | Lovelace |
| 2011/0196661 | A1 | 8/2011 | Spicola et al. |
| 2011/0202424 | A1 | 8/2011 | Chun et al. |
| 2011/0279650 | A1 | 11/2011 | Liao et al. |
| 2011/0311109 | A1 | 12/2011 | Demarais et al. |
| 2012/0005047 | A1 | 1/2012 | Hughes |
| 2012/0008865 | A1 | 1/2012 | Wu et al. |
| 2012/0021837 | A1 | 1/2012 | Shafter |
| 2012/0054691 | A1 | 3/2012 | Nurmi |
| 2012/0306876 | A1* | 12/2012 | Shotton ............... G06T 17/10 345/424 |

OTHER PUBLICATIONS

Deer Hunter (series) Wikipedia article, printed on Jan. 12, 2016.*
www.nonameoutdoors.com; main website page on Sep. 15, 2009; retrieved from web.archive.org "Internet Archive Wayback Machine" on May 14, 2015; 8 pages.
www.seemehunt.com; main/home website page on May 19, 2010; retrieved from web.archive.org "Internet Archive Wayback Machine" on May 14, 2015; 4 pages.
http://www.polhemus.com/?page=Scanning_Fastscan; FastSCAN Handheld Laser Scanner; printed on Jul. 10, 2013; 2 pages.

* cited by examiner

FIG. 10
System Diagram

COMPUTERIZED IMAGING OF SPORTING TROPHIES AND USES OF THE COMPUTERIZED IMAGES

CROSS REFERENCE TO RELATED APPLICATIONS

This application is a divisional of U.S. Ser. No. 13/940,592, filed on Jul. 12, 2013, which is a divisional of U.S. Ser. No. 12/900,971, filed on Oct. 8, 2010, which claims the benefit of continuation-in-part of U.S. Ser. No. 11/942,045, filed on Nov. 19, 2007, which claims the benefit of continuation-in-part application U.S. Ser. No. 11/700,360, filed on Jan. 31, 2007, which claims the benefit of continuation application U.S. Ser. No. 11/170,573, filed on Jun. 29, 2005, which claims the benefit of U.S. provisional patent application Ser. No. 60/584,908, filed Jul. 1, 2004, the content of which are hereby incorporated by reference in its entirety.

BACKGROUND OF THE INVENTION

Devices are known for creating three-dimensional ("3D") image representations of items having complex shapes. For example, ShapeGrabber Inc. of Ottawa, Ontario, Canada designs, manufacturers and markets 3D laser scanners and 3D laser digitizers for 3D inspection, modeling and reverse engineering. The same company provides scanner services on a project basis. Because of their high-tech and costly nature, 3D imaging systems, such as ShapeGrabber, are generally limited to industrial and business applications.

The technology that the typical sportsman (e.g., a hunter, a trapper, a fisherman) possesses is generally limited to much less costly devices, such as Global Positioning Systems (GPS). Further, in the process of recording and display of sporting trophies, or portions thereof, sportsmen generally rely on relatively primitive means, such as having a mount of the original animal, or portion thereof, created. Further, sportsmen often use hand measurements to implement trophy scoring systems for comparison, categorization, and/or ranking of their sporting trophy. As defined herein, "sporting trophy" means any non-living biological specimen obtained by a sportsman while engaged in their sport.

Most sportsmen (e.g., hunters, fishermen) participate in their respective sports with the goal of catching or taking animals with specific characteristics. On the occasion of acquiring a trophy animal (e.g., a deer with a large set of antlers, a fish with a great weight and/or length), sportsmen typically seek to record and display their achievements. This is generally done through the use of "mounts" (i.e., taking the trophy to a taxidermist) of their sporting trophy and in some circumstances with the use of scoring systems for comparison and ranking. However, this process requires that the original, or at least a mold thereof, be utilized. Thus, in cases of intentional or accidental disposal (e.g., through destruction or theft) of the original sporting trophy, a sportsman is unable to replace the trophy with an identical copy. Additionally, if the sporting trophy is damaged or otherwise flawed, the resulting mount, or mold thereof, would also contain the defects of the original.

Another major aspect related to sporting trophies pertains to scoring and ranking systems. For many years, sportsmen have been utilizing scoring systems to establish a numerical basis for categorizing and ranking sporting trophies such as antlers (e.g., whitetail deer antlers, elk antlers, moose antlers). Examples of such systems, illustratively in the context of deer antlers, include the Boone and Crocket, and the Pope and Young Score Charts. Determining the score of a set of deer antlers using the Boone and Crockett Scoring system, as well as other scoring systems, generally comprises measuring various characteristics, such as the length and spacing of each tine, and the length and circumference of the main rack beams. Further, many scoring systems for sporting trophies comprise a number of categories (e.g., typical and non-typical antlers), each of which may be scored differently. For example, antlers ranked in the "typical" categories are given a higher score for symmetry.

As a result, the process of measuring and scoring sporting trophies is very labor intensive and requires precise measurement. The determination of accurate and consistent scores is very time-consuming and difficult as a great number of characteristics must be taken into account. The implementation of conventional scoring systems by hand leads to the possibility of error and/or ambiguity resulting from human error and/or lack of precision. Thus, there exists a need to implement economical and consistent systems of scoring sporting trophies. Further, a consistent, economical, and precise means for reproduction and/or analysis of portions of animals for sportsmen is needed.

SUMMARY OF THE INVENTION

A method of generating and storing three-dimensional digital data indicative of a sporting trophy is provided. The method may be implemented in relation to a wide variety of sporting trophy applications. A sportsman can provide a sporting trophy to a scanning system to obtain three-dimensional image data relative to the sporting trophy. Sporting-relevant measurements can be computed based on the stored three-dimensional image data.

DETAILED DESCRIPTION OF THE PREFERRED EMBODIMENTS

Figure 1:
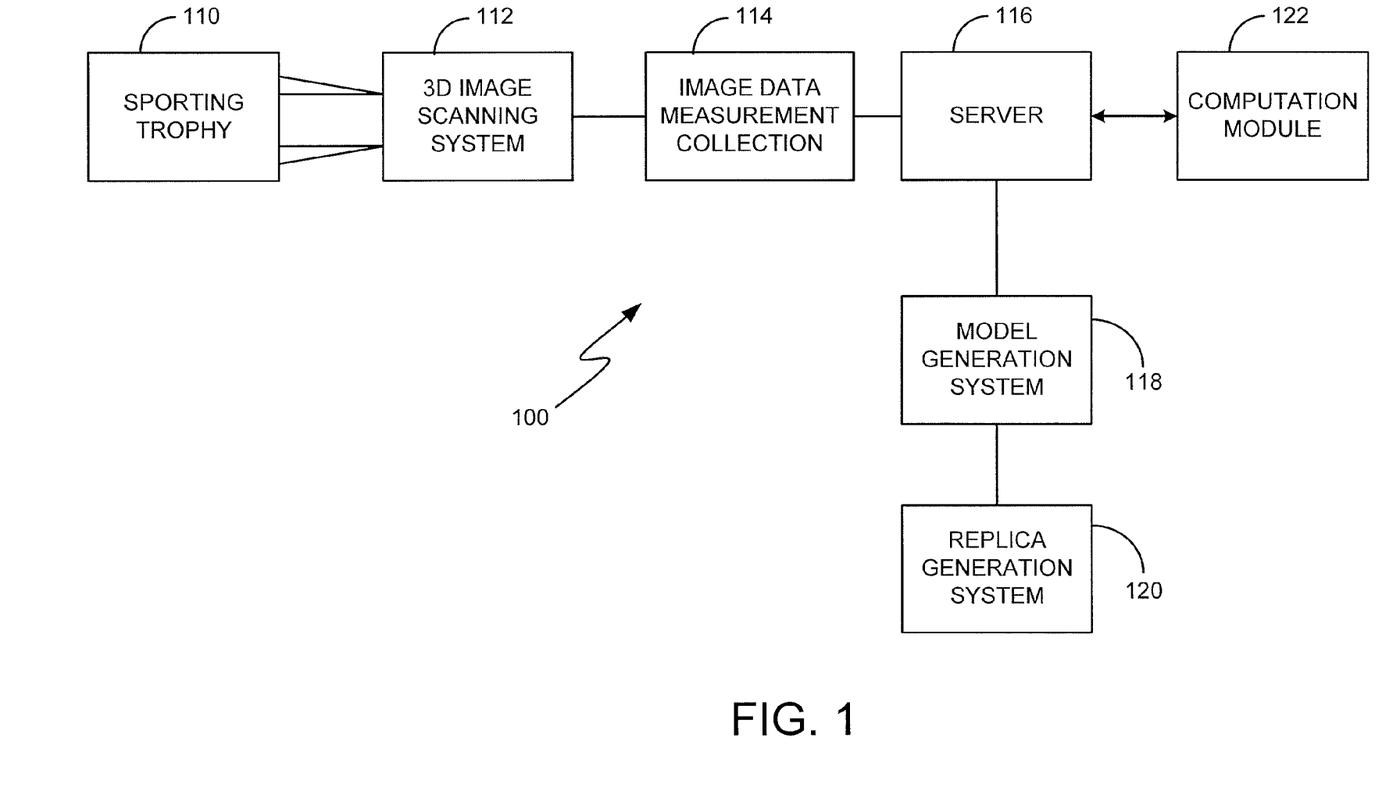
FIG. 1 is a block diagram of a system for obtaining digital data indicative of a sporting trophy.

In accordance with one embodiment of the present invention, FIG. 1 illustrates a system 100 pertaining to the imaging, reproduction and/or analysis of sporting trophy 110. It should be understood and appreciated that sporting trophies can be any animal that has been hunted, fished, or trapped, or any portion of the animal, such as antlers, skull, and horns. Examples of sporting trophies include, but are not limited to, those recognized and described by the Safari Club International and the Boone and Crocket Club. For the purpose of economizing description of aspects of the present invention, many embodiments described herein will be discussed in the context of imaging, measurement, and reproduction of deer antlers.

In accordance with one aspect of the present invention, 3D image scanning system 112 creates a 3D representation of sporting trophy 110. In one embodiment, image scanning system 112 comprises a machine or service, such as those offered by ShapeGrabber, Inc., enabling a free-formed scan of surfaces associated with sporting trophy 110. Accordingly, a 3D representation of trophy 110 is generated. However, it is important to note that any suitable system can be employed to obtain 3D image data of sporting trophy 110.

After sporting trophy 110 has been reduced to digital image form, image data measurement 114 produces and collects precise measurements of the sporting trophy 110 based on the image data. In accordance with one embodiment, a 3D grid is constructed around the sporting trophy 110 in order to provide a context for precise measurement. In one embodiment, the grid is divided into measurement portions that are hundredths of an inch to scale.

In accordance with another embodiment of the present invention, after the image data has been collected, the image data is stored on a computerized server 116 for access as needed. Server 116 is one example of the three-dimensional image data being stored on a computer-readable medium. Other examples include storing the data on media such as a CD-ROM, or a memory stick, for example. In one aspect, the data on server 116 is accessible from remote locations, such as over the Internet. In another aspect, computation module 122 catalogs and ranks the image data in the context of previously stored data associated with other sporting trophies. For example, the sporting trophy can be ranked based on size or quality of incorporated features. Different sets of rankings can be generated for different categories such as geography, age of hunter, and the like. Further, the ranking of the antlers can be based, at least in part, on a selected scoring system.

In accordance with another embodiment of the present invention, the image data (or corresponding data derived therefrom) is supplied to a model generation system 118. Model generation is a machine or other suitable system that creates a model representation based on the image data. For example, distilled data, such as a vectorized representation of the sporting trophy 110 in three-dimensional space using polar coordinates, can be generated based on the 3D image data. That distilled data, or the image data itself, can be provided to replica generation system 120, such as a computer numerically controlled (CNC) cutting system in order to carve or otherwise machine a highly accurate replica of the originally scanned sporting trophy 110. In one aspect, the image data is copied from server 116 and provided to system 120 to create a replica of the subject of the image data. Although a CNC machine is described herein, it should be understood and appreciated that any suitable device known in the art can be used for providing the replica of the sporting trophy 110, such as plastic molding devices, plasma cutters and the like, in accordance with embodiments of the present invention.

It should be understood and appreciated that the replicas created by the replica generation system 120 can be fabricated from various materials of construction known in the art, such as plastic, gold, silver, platinum, plaster, marble, and combinations thereof. It should also be understood and appreciated that the replicas created by the replica generation system 120 can vary in size relative to the sporting trophy 110, such as substantially the same size, miniature, or any size therebetween. In one embodiment of the present invention, the replica can be substantially the same size as the sporting trophy 110. In another embodiment of the present invention, the replica can be a miniature of the sporting trophy 110. In one embodiment of the present invention, the miniature is less than about 50% of the size of the sporting trophy 110. In another embodiment, the miniature is less than about 10% of the size of the sporting trophy 110. The miniature replicas can be used as a number of different products. For example, the miniature replicas can be novelties, figurines, tie tacks, paper weights, card holders, and the like.

In accordance with another embodiment of the present invention, model generation system 118 can be utilized to correct damage or other imperfections in sporting trophy 110. In some instances, the sporting trophy 110 may be damaged during the hunt, or under other circumstances. For example, in the context of fishing, a fish may have been injured (e.g., bit by another fish) resulting in exterior blemishes. In these instances, the sporting trophy 110 is less appealing or desirable because it is not in a pristine condition. Accordingly, model generation 118 may be utilized to digitally correct flaws in the digital image of sporting trophy 110 before replica generation system 120 creates a replica of sporting trophy 110.

In accordance with another embodiment of the present invention, the 3D digital representation (or a corresponding data set based thereon) is provided to the replica generation system 120 (e.g., a CNC (or another) machine) in order to create a negative 3D replica of the originally scanned object. In one embodiment of the present invention, a mold can be formed in a block of material. These molds can be utilized to create a synthetic representation for any purpose such as, but not limited to, the creation of candles in the shape of the antlers. In another embodiment, the negative 3D replica can be provided in a transparent or substantially transparent material, such as glass, plastic, crystal, and the like. An example of the negative 3D replica provided in the transparent or substantially transparent material is a laser enhanced crystal containing the negative 3D replica therein. It should be understood and appreciated that the negative 3D replica can be put into any transparent or substantially transparent material by any method known in the art, such as laser engraving. Similar to the replicas described herein, it should also be understood and appreciated that the negative 3D replicas can be any size relative to the original sporting trophy 110, such as substantially the same size, miniature, or any size therebetween.

Figure 2:
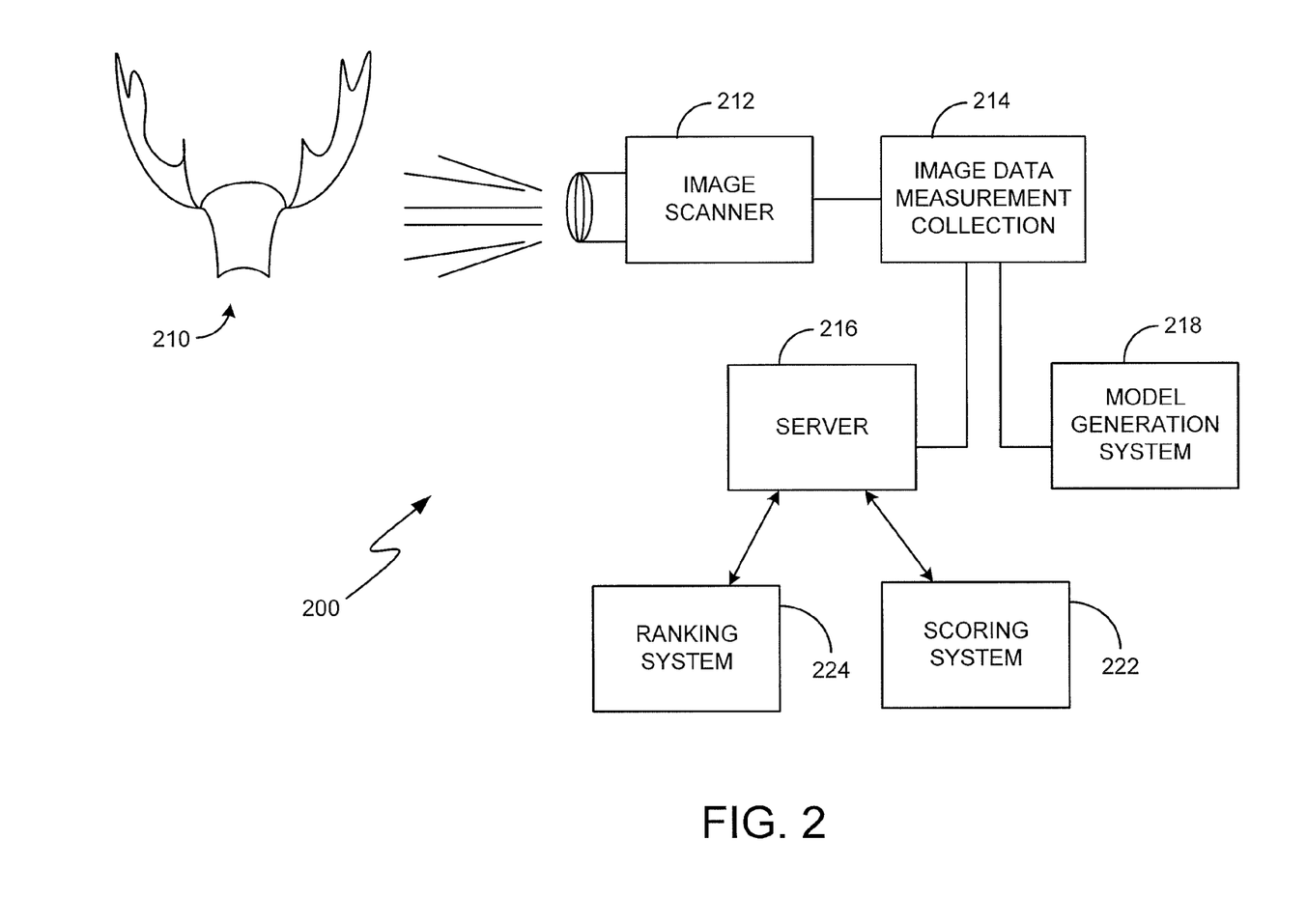
FIG. 2 is a block diagram illustrating a system for obtaining digital data indicative of a set of antlers.

FIG. 2 illustrates system 200 for the imaging, reproduction and/or analysis of deer antlers in accordance with one embodiment of the present invention. Antlers 210 are scanned by image scanner 212 and the resultant 3D image data are supplied to image data measurement and collection system 214. The image data corresponding to antlers 210 can be supplied to model generation system 218. Model generation is, illustratively, substantially similar to model generation system 118, described in the context of FIG. 1. In one embodiment, model generation system 218 is used to create a substantially exact replica of antlers 210. In one example, the antlers of the World Record Whitetail Deer are scanned in order to create a corresponding 3D image data set (e.g., an image data set accurate down to a hundredth of an inch relative to the original antler). The image data (or a corresponding set of image data) can be provided to a cutting machine, or other suitable machine, which is programmed to create a model of the originally provided antler 210.

In accordance with one embodiment of the present invention, the described duplication process will enhance the enjoyment of "shed hunting." Deer shed their antlers every year and it is common for people to hunt the sheds. If an individual who is shed hunting finds a large single of a pair of antlers, it becomes desirable for the individual to create a synthetic model of the other side of the pair of antlers. In this situation model generation system 218 can be utilized to reduce the found single antler to a 3D representation. That image data is then manipulated in order to create a data set that represents a relative mirror image representation of the originally scanned side of the found single antler. For example, if the individual found a right-hand side antler, a 3D data representation is produced for the left-hand side antler. Once an image data set has been created for the missing antler, the data can be utilized to create a model of the missing antler, or of the entire rack.

As discussed above, in the context of hunting, fishing, and other sports involving the capture or taking of animals, many systems are implemented to score, rank, and/or categorize sporting trophies. For instance, deer antlers are ranked by systems such as the Boone and Crocket and the Pope and Young Score Charts. In accordance with one embodiment of the present invention, the image data corresponding to antlers 210 are supplied to server 216. Server 216 may be any suitable computing system, implemented over a network or locally, for performing computation, sorting, and/or analysis of the image data. In one embodiment, scoring system 222 is utilized to implement a desired scoring system (e.g., Boone and Crocket Score Chart, Pope and Young Score Chart). It is important to note that any suitable scoring systems, such as simple size and weight measurements, are within the scope of the present invention. Additionally, specific sporting trophy measurements and scoring calculations can be performed using computed total volumetric displacement calculations in addition to or in lieu of standard linear measurements. This automated total volumetric calculation can be performed with respect to any suitable sporting trophy and is not limited to antlers of horned animals. It should be understood and appreciated that any suitable method can be used to calculate the total volumetric displacement.

Typically, the standard linear measurements of a sporting trophy are acquired by employing a measuring device, such as a measuring tape, and measuring predetermined external portions, such as those recognized by the Safari Club International and the Boone and Crocket Club, of the sporting trophies by hand. The lengths of the predetermined external portions of the sporting trophies are combined to provide an overall score for the sporting trophies. Measuring the predetermined external portions of the sporting trophies by hand provides a relatively subjective manner of measuring, which can lead to inconsistencies in the measurements.

Figure 3:
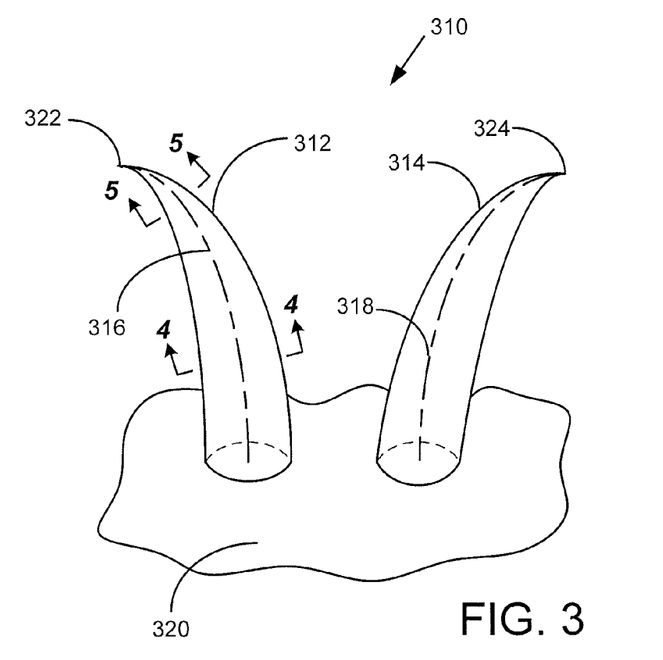
FIG. 3 is a front elevational view of an embodiment of a sporting trophy in accordance with the present invention.

In accordance with another embodiment of the present invention, the scoring system 222 provides a universal measuring system for providing consistent linear measurements of sporting trophies. Referring now to FIG. 3, shown therein is a sporting trophy 310 having a first horn 312 and a second horn 314. The first and second horns 312 and 314 have at least one internal length 316 and 318, respectively. It should be understood and appreciated that the sporting trophy can be any sporting trophy described herein and is not limited to horns like those shown in FIG. 3. Generally, the internal lengths 316 and 318 extend along predetermined portions of a sporting trophy 310. For example, the predetermined portions of the sporting trophy 310 shown in FIG. 3 extend from a base portion 320 of the sporting trophy 310 to a first end portion 322 of the first horn 312 and from the base portion 320 to a second end portion 324 of the second horn 314. The scoring system 222 consistently measures the internal lengths 316 and 318 along predetermined portions of the sporting trophy 310.

Figure 4:
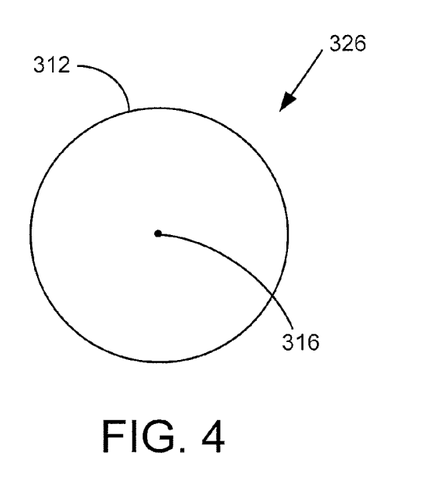
FIG. 4 is a cross-sectional view along line 4-4 of FIG. 7.
Figure 5:
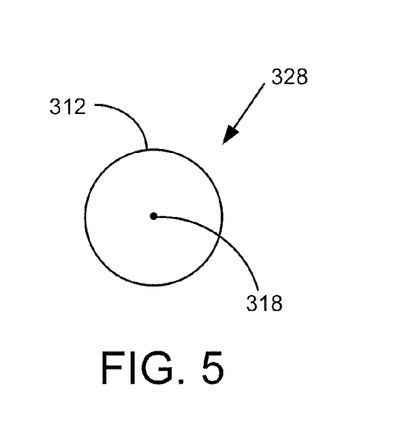
FIG. 5 is a cross-sectional view along line 5-5 of FIG. 7.

The scoring system 222 provides consistent measurements of the internal lengths 316 and 318 of the sporting trophy 310. The scoring system 222 provides the internal lengths 316 and 318 of the sporting trophy 310 disposed at the substantial center of any given cross-section perpendicular to the predetermined portion of the sporting trophy 310. Referring now to FIGS. 4 and 5, shown therein are cross-sections 326 and 328 of the first horn 312 of the sporting trophy 310. The cross-sections 326 and 328 of the first horn 312 show the internal lengths 316 and 318 substantially disposed at the center of the cross-sections 326 and 328. It should be understood and appreciated that any perpendicular cross-section taken along the predetermined portions of the sporting trophy has the internal lengths disposed substantially in the center. It should be understood and appreciated that the internal lengths measured by the scoring system 222 can be subjected to a net measurement system or a gross measurement system, such as those implemented by the Safari Club International and the Boone and Crocket Club.

In accordance with another embodiment of the present invention, the surface area of the sporting trophy is determined and provided by the scoring system 222 as an additional scoring parameter. The surface area can be used to score the sporting trophy in addition to or in lieu of either standard linear measurements and/or total volumetric calculation. It should be understood and appreciated that the surface area can be determined by any method known in the art for determining the surface area of a 3D image of a sporting trophy. It should also be understood and appreciated that the scoring system 222 can use standard linear measurements of the sporting trophy, the volumetric displacement of the sporting trophy, the surface area of the sporting trophy, or any combination thereof to score the sporting trophy.

In accordance with another embodiment of the present invention, the weight of the sporting trophy is determined and provided to the scoring system 222 as an additional scoring parameter. It should be understood and appreciated that the density of the sporting trophy can be determined from the volume and the weight and be used as an additional scoring parameter. The weight can be used to score the sporting trophy in addition to or in lieu of the standard linear measurements, the surface area and/or the total volumetric calculation. It should also be understood and appreciated that the scoring system 222 can use standard linear measurements of the sporting trophy, the volumetric displacement of the sporting trophy, the surface area of the sporting trophy, the weight of the sporting trophy, the density of the sporting trophy, or any combination thereof to score the sporting trophy.

In accordance with another embodiment of the present invention, ranking system 224 enables a wider range of scoring of sporting trophies. Ranking system 224 can be locally implemented and provides ranking services for antlers that have been scanned by the same image scanner. However, ranking system 224 can also be implemented over a network, such as the Internet, to provide ranking services for a large geographic area (e.g., county, state).

In accordance with yet another embodiment of the present invention, data can be divided into any of a number of subclasses including state-by-state results, or for sporting categories such as 3/3, 4/4, 5/5, etc. Rankings can be provided on an Internet site that can be accessed by the public at large. In one embodiment, a centralized entity is responsible for the website and is the official organization for recording results. That organization creates the digital image representations for record keeping purposes. For example, the organization can provide an indication of a record for the largest 3/3, 4/4, 5/5, etc. in each individual state. In one embodiment, the record holder in each class in each state is provided with a reward. Given the centralized record keeping, there becomes an incentive for a hunter to bring his or her trophy to the organization for imaging and accurate measurement.

Figure 6:
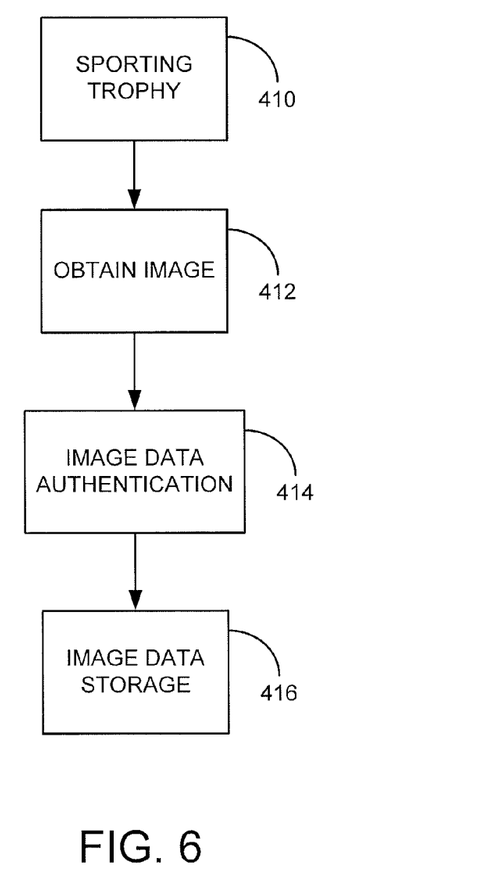
FIG. 6 is a flow diagram chart illustrating an embodiment of the present invention comprising authenticating image data obtained from a sporting trophy.

In accordance with one embodiment of the present invention, obtaining image data corresponding to a 3D scanned sporting trophy includes authenticating the image data. Illustrated in FIG. 6, a sporting trophy 410 is scanned and image data is obtained, as indicated at block 412. Image authentication 414 is created and issued relative to the digital image data of sporting trophy 410. Authentication can take any suitable form. Authentication may be as simple as placing a computer-readable medium containing the three-dimensional image data in a sealed package, which package is used to indicate authenticity. Additionally, the authentication can be provided in the form of digital data stored on the computer-readable medium. Yet another form of authentication can be provided by encrypting the three-dimensional data and controlling access to keys for decryption to allowed persons, such as the sportsman and/or approved taxidermists. Image data storage 416 may include storing the image authentication information along with the corresponding image data. In one embodiment, when the sportsman brings his or her sporting trophy for imaging and recordal, they are provided with a certificate of authenticity issued by the scanning entity. The certificate can include an image of the antlers along with information pertaining to the responsible hunter (e.g., social security number, hunting license number, etc.), as well as relevant scanning data such as the date and time of scanning, machine used for scanning, technician information who performed the scan, etc.

It is believed that taxidermists may collectively form an alliance and an agreement to not mount antlers for hunters who do not have a certificate of authentication. This may even reduce poaching. In one aspect, even if the antlers were mounted by a taxidermist who does not require an authenticity certificate, purchasers of antlers will become accustomed to requiring certificates for enhanced value. In the long run, antlers not associated with a certificate will lose their value. The organization that issues these certificates of authenticity will be able to reissue certificates if necessary (e.g., if lost or stolen).

Figure 7:
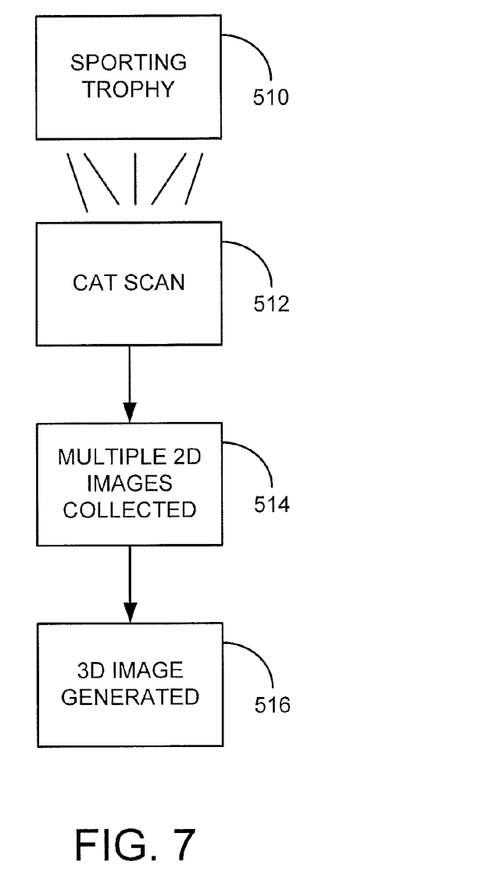
FIG. 7 is a flow diagram illustrating an embodiment of the present invention utilizing a CAT scan.

FIG. 7 is a diagrammatic view of a system that can be utilized to create a 3D image based on multiple two-dimensional ("2D") images in accordance with one embodiment of the present invention. First, a CAT (Computed Axial Tomography) scanned image 512 is conducted of a sporting trophy 510. A CAT scan involves using computers to generate multiple flat (i.e., two-dimensional) x-ray images one slice at a time. The multiple 2D images are collected (step 514) and used to generate a 3D image (step 516). The CAT scan images can be utilized to support a sportsmen-oriented scoring system based on bone structure, or any other suitable internal structure of the trophy. In one embodiment, such a process may be utilized for the scoring of fish. The image data generated from a CAT scan image can be utilized for any of the purposes described above in relation to the scanning equipment provided by ShapeGrabber Inc. For example, CAT scan images can be utilized as the basis for creating model representations of scanned objects. The scans can also be utilized for measurement purposes, the measurements being utilized in a record keeping system such as the ones described above in accordance with aspects of the present invention.

Figure 8:
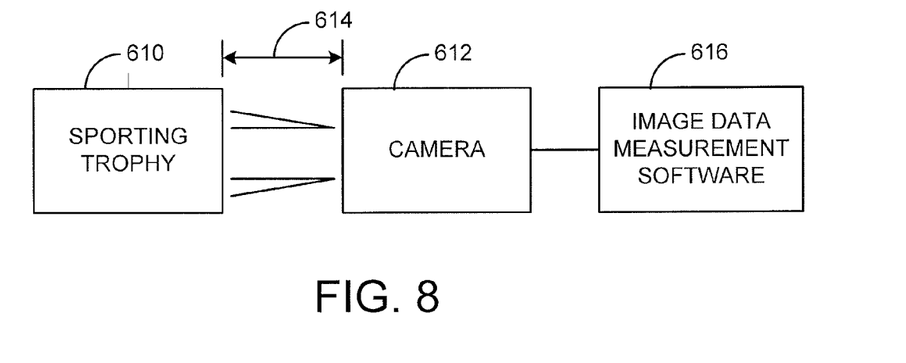
FIG. 8 is a block diagram illustrating an embodiment of the present invention utilizing a camera.

In another embodiment of the present invention, measurements are collected based on a plurality of two-dimensional images. FIG. 8 is a diagrammatic view of a camera 612 provided with a laser range finder. Camera 612 may be any suitable device or system for acquiring an image of sporting trophy 610. When a two-dimensional image of a target, illustratively sporting trophy 610, is collected, the distance 614 of camera 612 from the target is simultaneously obtained form the range finder. In accordance with one embodiment, image measurement software 616 can then be applied to measure an element in the picture (e.g., score a set of antlers) based, in part, on the distance 614 from the target trophy 610. For example, if a hunter is standing six feet away from a target and takes a picture, the range finder will determine that the hunter is six feet away. The software can then analyze a picture taken by the hunter in the context of the distance from the target in order to produce a relatively exact measurement of something within the picture (e.g., the antlers).

In another embodiment of the present invention, the camera 612, capturing the plurality of two-dimensional images, can be the camera 612 of a portable electronic device (ped), which includes cell phones or personal digital assistants (pda). The camera 612 of the ped can be used to capture two-dimensional images of a target animal. A target animal can be any living animal (or animal part) or any sporting trophy as defined herein. The ped can include software or an application that can take the plurality of two-dimensional images and provide three-dimensional image data relative to the target animal. The software or application of the ped can generate a sporting-relevant measurement of the target animal from the three-dimensional data. In another embodiment of the present invention, the two-dimensional images can be sent via a wireless communication link to a third party where the two-dimensional images are processed to produce three-dimensional image data. The third party then, in accordance with the methods described herein, provides a sporting-relevant measurement that is then sent back to the ped and thus, the ped user.

In one embodiment of the present invention, the ped could be an iPhone® or an iTouch® wherein the iPhone® or iTouch® is provided with an application (app) that can process a plurality of two-dimensional images of the target animal via any method known in the art or described herein to provide three-dimensional image data. The three-dimensional image data can then be used to determine any sporting-relevant measurement desired by the user of the iPhone® or iTouch®. For example, the user can provide the two-dimensional images to the iPhone® or iTouch® app and specify which specific sporting-relevant measurements the user desires for the target animal. It should be understood and appreciated that the sporting-relevant measurement can be any measurement known in the art for scoring target animals. Examples include, but are not limited to, Boone and Crockett measurements, volumetric measurements, surface area measurements, medial axial length measurements, Safari Club International measurements, and the like.

In another embodiment of the present invention, the ped could take numerous still image pictures per second of a sporting trophy and the still images could be combined to create three-dimensional image data of the sporting trophy. In another embodiment, the camera of the ped can be used in conjunction with a laser scanner wherein the camera collects the three-dimensional image data of a sporting trophy from the laser scanner. In yet another embodiment of the present invention, a distance gauge could be combined with a video camera of the ped to gauge the distance of the video camera from the sporting trophy. The distance calculated and the video camera image can be used to determine the three-dimensional image data of the sporting trophy.

In accordance with one embodiment of the present invention, the sportsman submits the sporting trophy (e.g., antlers) to a computerized imaging system. In some cases, this may be convenient where the sportsman can simply bring the sporting trophy to the location of a scanning apparatus. However, in other situations, the sportsman and the scanning apparatus may be located hundreds, if not thousands of miles from each other.

Figure 9:
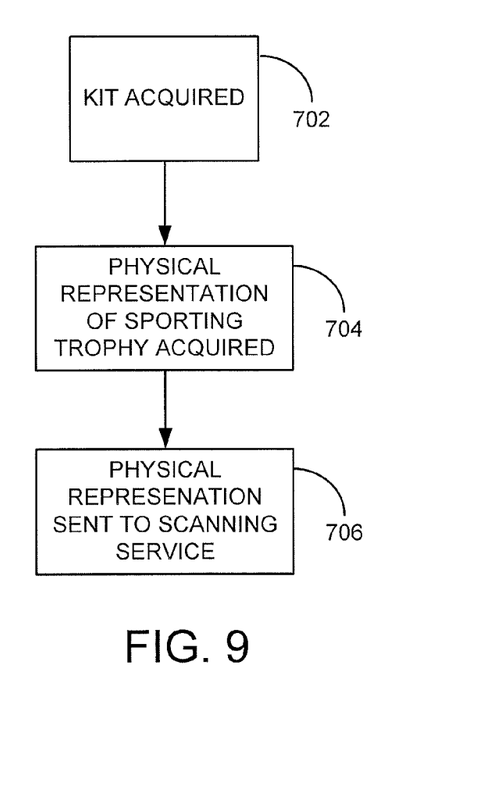
FIG. 9 is a flow chart illustrating an embodiment of the present invention utilizing a kit to acquire a physical representation of a sporting trophy.

FIG. 9 is a flow diagram of providing sporting trophy information to a scanning authority in accordance with an embodiment of the present invention. At block 702, a sportsman obtains a kit for acquiring a physical representation of a sporting trophy. The kit may comprise any means for creating a suitable representation of a sporting trophy. In one embodiment, the kit facilitates creation of a negative mold of the sporting trophy. For example, in one embodiment, the sportsman is provided with a molding compound and instructions to create a two-part kit that can form around the sporting trophy to generate a negative image thereof. In another embodiment, the kit includes a camera similar to that illustrated in FIG. 8. At block 704, the sportsman utilizes the kit to create a physical representation of the sporting trophy. Block 704 can include the mixing or preparation of the molding compound, placement of the sporting trophy within the prepared molding compound, and caring of the molding compound, and curing of the molding compound. The physical representation (e.g., the hardened or cured negative image of the sporting trophy) can then be shipped to the scanning entity, as indicated at block 706 without requiring the sportsman to part with his or her sporting trophy. Those skilled in the art will recognize that other methods and techniques for providing a physical representation of the sporting trophy to the scanning entity can be provided as well.

In another embodiment of the present invention, the three-dimensional scanning procedures, software and equipment described herein can be implemented to scan and provide measurements for any object existing in three dimensions. Examples of various other objects include, but are not limited to, agricultural products. More specifically, the procedures, software and equipment could be implemented to measure various parts of plants. Examples of parts of plants include, but are not limited to, leaves, branches, trunks, stems, roots, seeds, and the like.

In a further embodiment of the present invention, a social network can be constructed around the sharing of information concerning sporting trophies in accordance with the present invention.

Embodiments of the present invention are described herein in the context of a system, method, and apparatus for connecting users in an online computer or cellular (i.e., iPhone® and iPhone® applications, blackberry, and the like) system based on their relationships within social networks. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another, and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

DEFINITIONS

Degrees of Separation. The number of connections linking any two individuals in a social network. For example, if individual A is connected to individual B through two intermediate acquaintances (C and D) they are connected at three degrees of separation.

Descriptive Data. Information that describes a user or characteristics of a user. For example, descriptive data might include a first and last name. Or it might include elements that describe attributes related to the user, such as location, age, type of sporting trophy, or any information about the sporting trophy.

Friend. In an exemplary implementation of the system, the list of users who have accepted invitations from a user to join the system or have otherwise been designated as having a direct (i.e., one degree) relationship with the user.

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations that may be made in the future, including changes and additions to existing standard protocols.)

Interface. Any mechanism by which an external individual or external computer can obtain and provide data, respectively to or from the database of the present invention. One common example of the interface is a website. Other examples might include an e-mail message, a telephone voice message or a paper report.

Intermediate acquaintance(s). The individual or individuals connecting any two other individuals in a social network.

For example, if A is connected to B through C and D (i.e., A< >C< >D< >B) then C and D are the intermediate acquaintances.

Mutual acquaintance. See "Intermediate Acquaintance."

Relationship Data. Information about the friends of a user of the system. Can include the list of friends, list of individuals invited to join the system, etc.

Social Network. An aggregation of individual social relationships, out to any number of degrees of separation.

User. An individual who has registered in the system.

Website. A computer system that serves informational content over a network using the standard protocols of the World Wide Web. As used herein, the term is generally intended to encompass both (i) the hardware/software server components that serve the informational content over the network, and (ii) the "back end" hardware/software components, including any non-standard or specialized components, that interact with the server components to perform services for website users.

Figure 10:
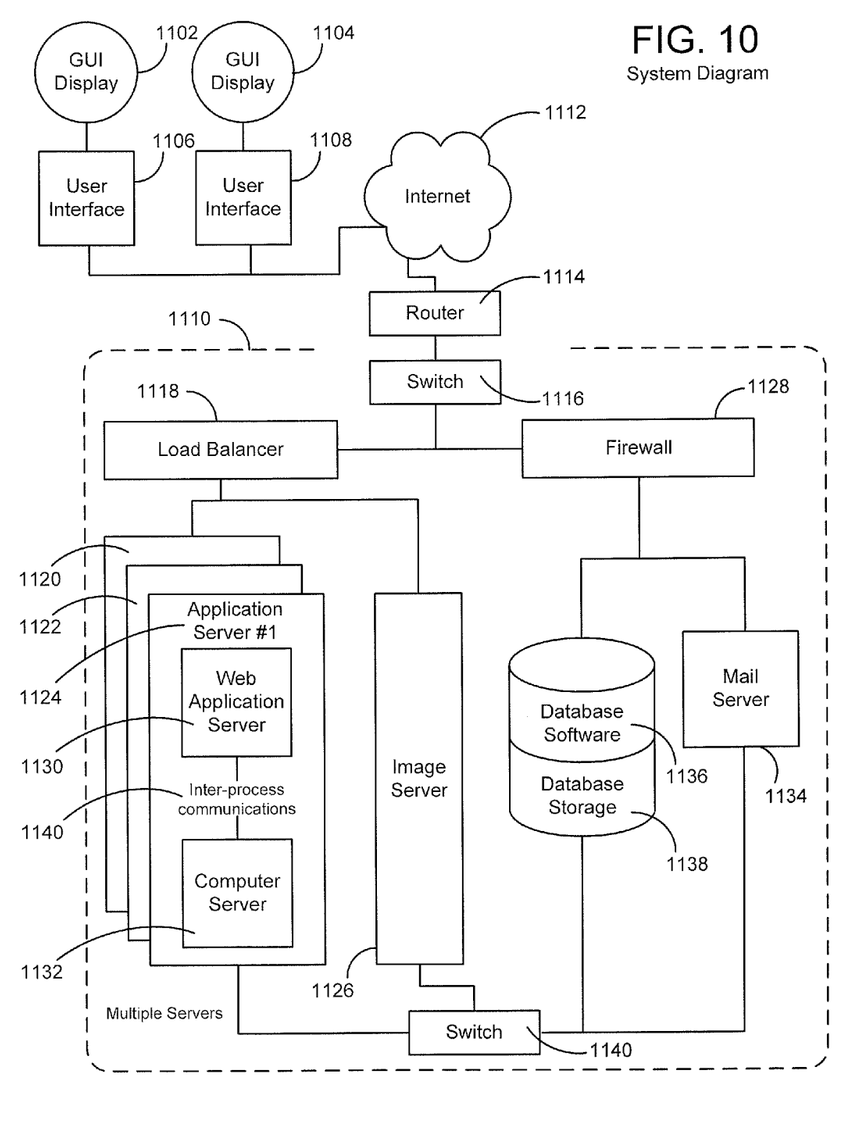
FIG. 10 shows a block diagram of components of a system for connecting people within a social network in accordance with one embodiment of the present invention.

FIG. 10 illustrates the general architecture of a system that operates in accordance with one embodiment of the present invention. As shown in FIG. 10, a plurality of graphical user interface (GUI) displays 1102 and 1104 are presented on a plurality of user interface devices 1106 and 1108 connected to an apparatus 1110 via the Internet 1112. The user interface may be any device capable of presenting data, including, but not limited to, cellular telephones, television sets or handheld "personal digital assistants." As used herein, the term "Internet" generally refers to any collection of distinct networks working together to appear as a single network to a user. The term refers to the so-called world wide "network of networks" that are connected to each other using the Internet protocol (IP) and other similar protocols. The Internet provides file transfer, remote log-in, electronic mail, news and other services. As described herein, the exemplary public network of FIG. 10 is for descriptive purposes only. Although the description may refer to terms commonly used in describing particular public networks such as the Internet, the description and concepts equally apply to other public and private computer networks, including systems having architectures dissimilar to that shown in FIG. 10. For example, and without limitation thereto, the system of the present invention can find application in public as well as private networks, such as a closed university social system, or the private network of a company.

The apparatus 1110 is connected to the Internet 1112 through a router 1114 and a switch 1116. As is well known in the relevant art(s), routers forward packets between networks. The router 1114 forwards information packets between the apparatus 1110 and devices 1106 and 1108 over the Internet 1112. A load balancer 1118 balances the traffic load across multiple mirrored servers 1120, 1122, 1124 and a firewall 1128 provides protection from unauthorized access to the apparatus 1110. The switch 1116 may act as a gatekeeper to and from the Internet 1112. The components appearing in the apparatus 1110 refer to an exemplary combination of those components that would need to be assembled to create the infrastructure in order to provide the tools and services contemplated by the present invention. As will be apparent to one skilled in the relevant art(s), all components "inside" the apparatus 1110 may be connected and may communicate via a wide or local area network (WAN or LAN).

The apparatus 1110 includes an application server 1124 or a plurality of application servers 1124. The application server 1124 comprises a web application server 1130 and a computer server 1132 that serves as the application layer of the present invention. Yet another server is the image server 1126, which has the purpose of storing and providing digital images to other components of the apparatus 1110. Also included is a mail server 1134, which sends and receives electronic messages to and from devices 1106 and 1108. Also included are the database software 1136 and a database 1138.

The web application server 1130 is a system that sends out web pages in response to hypertext transfer protocol (HTTP) requests from remote browsers (i.e., users of the apparatus 1110). That is, the web server 1130 provides the GUI 1102 and 1104 to users of the system in the form of web pages. These web pages sent to the user's device 1106 and 1108 would result in GUI screens 1102 and 1104 being displayed.

The apparatus 1110 also includes a second switch 1140 that allows the components of the apparatus to be interconnected in a local area network (LAN) or a wide area network (WAN). Thus, data can be transferred to and from the various components of the apparatus 1110.

As will be appreciated by those skilled in the relevant art(s), this configuration of router 1114 and switch 1116 is flexible and can be omitted in certain embodiments. Additional routers 1114 and/or switches 1116 can also be added.

The application server 1124, the database(s) 1136 and 1138 and the mail server 1134 are shielded from the public Internet 1112 through the firewall 1128. The firewall 1128 is a dedicated gateway machine with special security precaution software. It is typically used, for example, to service Internet 1112 connections and dial-in lines and protects the cluster of more loosely administered network elements hidden behind it from external invasion. Firewalls are well known in the relevant art(s).

As will be appreciated by those skilled in the relevant art(s), the inclusion of the firewall 1128 is flexible and can be omitted in certain embodiments. Additional firewalls 1128 can also be added.

The computer server 1132 may include a central processing unit (CPU), a random access memory (RAM) temporary storage of information, and a read only memory (ROM) for permanent storage of information. Computer server 1132 may be generally controlled and coordinated by an operating system software. The operating system controls allocation of system resources and performs tasks such as processing, scheduling, memory management, networking and I/O services, among other things. Thus, the operating system resident in system memory and executed by CPU coordinates the operation of the other elements of the apparatus 1110.

Although the description of the computer server 1132 may refer to terms commonly used in describing particular computer servers, the description and concepts equally apply to other processing systems, including systems having architectures dissimilar to that shown in FIG. 10. Also included is an inter-process communications protocol (IPCP), a set of rules for marshalling and un-marshalling parameters and results. This is the activity that takes place at the point where the control path in the calling and called process enters or leaves the IPCP domain. The IPCP is essentially a set of rules for encoding and decoding information transmitted between multiple processes.

As will be appreciated by those skilled in the relevant art(s), the inclusion of the IPCP is flexible and can be substituted or omitted in certain embodiments.

The apparatus 1110 may also include the image server 1126 or a plurality of image servers that manage(s) digital photographs and other human viewable images. The image server 1126 may be configured separately from the web server 1130. This configuration may increase the scalability of the server apparatus 1110. Alternatively, the web server 1130 and the image server 1126 can be configured together. Examples of image formats that can be managed by the image server 1126 include, but are not limited to, graphical interchange format (GIF), joint photographics experts group (JPEG), or portable network graphics (PNG) or tagged image file (TIF).

The mail server 1134 is a repository for e-mail messages received from the Internet 1112. It also manages the transmission of electronic messages ("electronic mail" or "e-mail"). The mail server 1134 consists of a storage area, a set of user definable rules, a list of users and a series of communication modules. Its primary purpose in the present invention is the storage and distribution of e-mail messages to the Internet 1112.

The databases 1136 and 1138 store software, descriptive data, digital images, system data and any other data item required by the other components of the apparatus. The databases may be provided, for example, as a database management system (DBMS), and object-oriented database management system (ODBMS), a relational database management system (e.g., DB2, ACCESS, etc.), a file system or another conventional database package. Thus, the databases 1136 and 1138 can be implemented using object-oriented technology or via text files. Further, the databases 1136 and 1138 can be accessed via a structured query language (SQL) or other tools known to one of ordinary skill in the art.

In one embodiment of the present invention, a computer system for managing connection between registered users of an online social network is provided. The computer system can be constructed as described herein. The computer system includes a server computer and a database for storing information for registered users. In addition to information for registered users, the database can store three-dimensional image data of a sporting trophy and information relating to the sporting trophy provided by a registered user. In another embodiment of the present invention, each registered user establishes a unique user ID and/or corresponding password to access the computer system. The registered users can access the computer system via a website connected to the internet.

Another embodiment of the present invention includes a method of implementing the computer system described herein. This method includes providing the server computer and providing the database of registered users for storing information for each registered user.

In another embodiment of the present invention, a personalized video game is provided. The personalized video game includes the three-dimensional image data of the sporting trophy and video game software. The three-dimensional image data of the sporting trophy being incorporated into the video game software to provide the personalized video game.

In a further embodiment of the present invention, a method of providing a video game that incorporates the three-dimensional image data of the sporting trophy. The three-dimensional image data of the sporting trophy and video game software are provided. The video game software can be any video game software known in the art compatible with any known video gaming system. Examples of video gaming systems include, but are not limited to, Microsoft gaming systems, PC gaming systems, Sony® gaming systems, Nintendo gaming systems, and the like. Once the three-dimensional image data of the sporting trophy and video game software are provided, the three-dimensional image data of the sporting trophy is incorporated into the video game software to provide a personalized video game software. The personalized video game software can then be incorporated into a video game. The video game, like the video game software, is compatible with any known video gaming system.

In another embodiment of the present invention, the social network can include the ranking system 224 to rank and/or track the various sporting trophies described herein. The sporting trophies can be sorted into types (or species of animal), such as mule deer, white tail deer, elk, moose, elephant, bear, and the like. Sporting trophies can include all those types described herein and any sporting trophy known in the art that can be scored. Each sporting trophy that is scanned and scored in accordance with the present invention can be provided with various scores corresponding to specific scoring protocols. For example, the scoring protocol can be Boone and Crocket, Safari Club International, a volume including scoring system, a surface area including scoring system, or a combination thereof. The scored sporting trophy can also be provided with various other information corresponding to the sporting trophy. Other information corresponding to the sporting trophy can include, but is not limited to, the location (e.g., city, county, state, and country) where the sporting trophy was apprehended and the name, age, gender, and address of the individual that apprehended the sporting trophy.

The various sporting trophies that are provided to the ranking system 224 can be ranked according to the sporting trophies' species and/or the various scoring protocols. Any user of the social network and/or corresponding website would be able to see the ranking of every sporting trophy by species and/or by the various scoring protocols. The users would also be able to sort the ranking of sporting trophies by the various other information provided herein. For example, a user could sort the sporting trophies by species, scoring protocol, location where the sporting trophy was apprehended, or any combination thereof. The user would also be able to have access to the three-dimensional data corresponding to any sporting trophy provided to the ranking system 224, the social network, and/or any website associated therewith.

Although the present invention has been described with reference to preferred embodiments, workers skilled in the art will recognize that changes may be made in form and detail without departing from the spirit and scope of the invention.

What is claimed is:

1. A method of providing a personalized video game, comprising the steps of:
    locating a sporting trophy proximate to a computerized scanner;
    scanning the sporting trophy with the computerized scanner to generate three dimensional image data of the sporting trophy;
    storing the three dimensional image data of the sporting trophy in a non-transitory computer readable medium; and
    incorporating the three dimensional image data of the sporting trophy in the personalized video game, wherein the personalized video game is playable on a game system.

2. The method of claim 1 wherein the three dimensional image data of the sporting trophy includes information specific to the sporting trophy.

3. The method of claim 2 wherein the information relating to the sporting trophy is selected from the group consisting of type of sporting trophy, any volume, any surface area, any linear measurements, any weights, any sporting-relevant measurement, any internal length of a portion of the sporting trophy, and any combination thereof.

4. A non-transitory computer readable medium storing instructions that when executed by a processor generate a personalized video game by performing the following steps:
   locating a sporting trophy proximate to a computerized scanner;
   scanning the sporting trophy with the computerized scanner to generate three dimensional image data of the sporting trophy;
   storing the three dimensional image data of the sporting trophy in the non-transitory computer readable medium; and
   incorporating the three dimensional image data of the sporting trophy in the personalized video game, wherein the personalized video game is playable on a game system.

5. The video game of claim 4 wherein the three dimensional image data of the sporting trophy includes information specific to the sporting trophy.

6. The video game of claim 5 wherein the information relating to the sporting trophy is selected from the group consisting of type of sporting trophy, any volume, any surface area, any linear measurements, any weights, any sporting-relevant measurement, any internal length of a portion of the sporting trophy, and any combination thereof.

* * * * *